(12) United States Patent
Bardsley et al.

(10) Patent No.: US 8,438,145 B2
(45) Date of Patent: *May 7, 2013

(54) METHODS, SYSTEMS, AND COMPUTER PROGRAM PRODUCTS FOR DETERMINING AVAILABILITY OF PRESENTABLE CONTENT VIA A SUBSCRIPTION SERVICE

(75) Inventors: Jeffrey S. Bardsley, Durham, NC (US); Mona Singh, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 6 days.

This patent is subject to a terminal disclaimer.

(21) Appl. No.: 13/106,944

(22) Filed: May 13, 2011

(65) Prior Publication Data

US 2011/0213760 A1   Sep. 1, 2011

Related U.S. Application Data

(63) Continuation of application No. 11/607,221, filed on Dec. 1, 2006, now Pat. No. 7,962,460.

(51) Int. Cl.
*G06F 17/30* (2006.01)
*G06F 7/00* (2006.01)

(52) U.S. Cl.
USPC ............ 707/705; 707/707; 707/708; 706/15; 706/16; 706/20

(58) Field of Classification Search ................. None
See application file for complete search history.

(56) References Cited

U.S. PATENT DOCUMENTS

| | | | |
|---|---|---|---|
| 6,772,434 B1 | 8/2004 | Godwin | |
| 6,952,236 B2 | 10/2005 | Orr | |
| 7,143,066 B2 | 11/2006 | Shear et al. | |
| 7,539,631 B1 * | 5/2009 | El-Haj | 705/26.1 |
| 7,565,310 B2 * | 7/2009 | Gao et al. | 705/26.8 |
| 7,881,657 B2 | 2/2011 | Wang et al. | |
| 8,086,171 B2 | 12/2011 | Wang et al. | |
| 2002/0072982 A1 | 6/2002 | Barton et al. | |
| 2002/0092019 A1 * | 7/2002 | Marcus | 725/37 |
| 2002/0161741 A1 | 10/2002 | Wang et al. | |
| 2003/0065774 A1 | 4/2003 | Steiner et al. | |
| 2003/0131142 A1 * | 7/2003 | Horvitz et al. | 709/313 |
| 2003/0135553 A1 | 7/2003 | Pendakur | |
| 2003/0229900 A1 | 12/2003 | Reisman | |
| 2004/0031058 A1 | 2/2004 | Reisman | |
| 2004/0078812 A1 | 4/2004 | Calvert | |
| 2004/0117269 A1 | 6/2004 | Karaoguz et al. | |
| 2004/0140989 A1 | 7/2004 | Papageorge | |
| 2004/0163130 A1 | 8/2004 | Gray et al. | |
| 2004/0177063 A1 | 9/2004 | Weber et al. | |
| 2004/0210450 A1 | 10/2004 | Atencio et al. | |

(Continued)

OTHER PUBLICATIONS

Van Beek, et al., "Metadata-Driven Multimedia Access," IEEE Signal Processing Magazine, pp. 40-52 (Mar. 2003).

*Primary Examiner* — Angelica Ruiz

(57) ABSTRACT

Methods, systems, and computer program products for determining availability of presentable content via a subscription service are disclosed. According to one aspect, a method includes receiving an indication of first presentable content associated with a first subscription service. Metadata associated with the selected first presentable content is received. Based on the received metadata, it is determined whether second presentable content corresponding to the first presentable content is available from a second subscription service. Further, and indication is provided that the second presentable content is available.

54 Claims, 4 Drawing Sheets

U.S. PATENT DOCUMENTS

| | | |
|---|---|---|
| 2005/0080788 A1 | 4/2005 | Murata |
| 2005/0138063 A1* | 6/2005 | Bazot et al. .................. 707/102 |
| 2005/0160111 A1 | 7/2005 | Plastina et al. |
| 2005/0165816 A1 | 7/2005 | Schiller et al. |
| 2005/0188048 A1 | 8/2005 | Yuan et al. |
| 2005/0193425 A1 | 9/2005 | Sull et al. |
| 2005/0283807 A1 | 12/2005 | Lee et al. |
| 2006/0008256 A1* | 1/2006 | Khedouri et al. ............. 386/124 |
| 2006/0015904 A1* | 1/2006 | Marcus .......................... 725/46 |
| 2006/0026171 A1 | 2/2006 | Savage |
| 2006/0029093 A1 | 2/2006 | Van Rossum |
| 2006/0029296 A1* | 2/2006 | King et al. ................... 382/313 |
| 2006/0036642 A1* | 2/2006 | Horvitz et al. ................ 707/102 |
| 2006/0053077 A1 | 3/2006 | Mourad et al. |
| 2006/0117040 A1 | 6/2006 | Begeja et al. |
| 2006/0119900 A1* | 6/2006 | King et al. .................... 358/462 |
| 2006/0161635 A1 | 7/2006 | Lamkin et al. |
| 2006/0212943 A1* | 9/2006 | Kitazato et al. ................. 726/26 |
| 2006/0271928 A1* | 11/2006 | Gao et al. ...................... 717/176 |
| 2006/0272028 A1 | 11/2006 | Maes |
| 2006/0288009 A1* | 12/2006 | Pieper et al. ...................... 707/9 |
| 2007/0156770 A1* | 7/2007 | Espelien ....................... 707/200 |
| 2008/0082510 A1 | 4/2008 | Wang et al. |
| 2011/0099197 A1 | 4/2011 | Wang et al. |
| 2012/0076310 A1 | 3/2012 | Debusk et al. |
| 2012/0079515 A1 | 3/2012 | Wang et al. |

* cited by examiner

METHODS, SYSTEMS, AND COMPUTER PROGRAM PRODUCTS FOR DETERMINING AVAILABILITY OF PRESENTABLE CONTENT VIA A SUBSCRIPTION SERVICE

CROSS-REFERENCE TO RELATED APPLICATION

The present invention is a continuation of U.S. patent application Ser. No. 11/607,221, entitled "METHODS, SYSTEMS, AND COMPUTER PROGRAM PRODUCTS FOR DETERMINING AVAILABILITY OF PRESENTABLE CONTENT VIA A SUBSCRIPTION SERVICE", filed Dec. 1, 2006 now U.S. Pat. No. 7,962,460 and commonly owned with the present application and herein incorporated by reference.

TECHNICAL FIELD

The subject matter described herein relates to subscription services for presentable content. More particularly, the subject matter described herein relates to methods, systems, and computer program products for determining availability of presentable content via subscription services.

BACKGROUND

Many electronic devices provide a feature of presenting content to a user. Examples of suitable electronic devices for presenting presentable content include a mobile phone, a personal digital assistant (PDA), a network component, a television, a computer, and a device configured to implement a web portal. The electronic device may present the content to the user via a user interface. Content capable of being presented via an electronic device is referred to herein as presentable content. Examples of presentable content include video content, graphical content, audio content, text content, and any combination of these types of content. For example, video content may be presented via a display and one or more speakers. Audio content may be presented via one or more speakers. Text content may be presented via a display. The presentable content may be streamed to the electronic device and/or stored on the electronic device for presentation when selected by a user.

Presentable content may be provided to an electronic device by a subscription service. For example, a cable television subscription service may provide video and music content to a subscriber's television. In another example, a satellite-based music subscription service may provide music content to a subscriber's satellite radio receiver. In yet another example, an Internet-based music subscription service may provide musical content to a subscriber's computer for download to a portable media player. Further, a user may have more than one electronic device by which presentable content may be presented and received from different subscription services.

A user will often have a subscription to more than one subscription service and may own multiple different presentation devices. The user may obtain presentable content for one device and may desire to obtain the same or related content for presentation via another device. The same or related content that is desired to be obtained may be available through a different subscription service from the original content. For example, a user may be watching a music video provided via a cable television subscription service. In this example, the user may desire to determine whether music content associated with the music video is available via an Internet-based music subscription service for use on a portable media player. In order to determine the availability of the music content, the user must determine the title of the music in the music video and manually use searching features of the Internet-based music subscription service to find the music content. Further, the user may have to determine the compatibility of the portable media player with the music content available from the Internet-based music subscription service. It would be beneficial to provide for a user to conveniently select presentable content and automatically receive information regarding the availability of the presentable content at a subscription service. Further, it would be beneficial to provide for the automated and convenient communication of the presentable content to the electronic device.

Accordingly, in light of the above described difficulties and needs, there exists a need for improved methods, systems, and computer program products for determining availability of presentable content via a subscription service.

SUMMARY

According to one aspect, the subject matter described herein includes methods, systems, and computer program products for determining availability of presentable content via a subscription service. One method includes receiving a selection of first presentable content associated with a first subscription service. Metadata associated with the selected first presentable content is received. Based on the received metadata, it is determined whether second presentable content corresponding to the first presentable content is available from a second subscription service. Further, it is indicated whether the second presentable content is available for presentation via the second subscription service.

According to another aspect, a system is described for determining availability of presentable content via a subscription service. The exemplary system includes a subscription server configured to receive a selection of first presentable content associated with a first subscription service. The system also includes a subscription service manager configured to receive metadata associated with the selected first presentable content, configured to determine, based on the received metadata, whether second presentable content corresponding to the first presentable content is available from a second subscription service, and configured to indicate whether the second presentable content is available for presentation via the second subscription service.

BRIEF DESCRIPTION OF THE DRAWINGS

Preferred embodiments of the subject matter described herein will now be explained with reference to the accompanying drawings of which.

DETAILED DESCRIPTION

The subject matter described herein includes methods, systems, and computer program products for determining availability of presentable content via a subscription service. According to one aspect, a system according to the subject matter described herein may be implemented as hardware, software, and/or firmware components executing on one or more components of a system or device configured to present presentable content.

As stated above, the term "presentable content" refers to any suitable content capable of being presented to a user via an electronic device. In one example, presentable content may include video content. Examples of video content include all or a portion of a movie, a television program, a video game, and a home movie. In another example, presentable content may include audio content. Examples of audio content include music and a voice recording. In yet another example, presentable content may include text content. Examples of text content include a text message, a text window displayed on a display, a word processing document, and text of a web page document.

As used herein, the term "subscription service" refers to a service operable to provide presentable content to a subscriber. Examples of subscription services include a music subscription service, an Internet-based subscription service, a television subscription service, and a satellite-based subscription service.

A subscription service may provide presentable content to a subscriber via any suitable communications technique. For example, presentable content may be made available via a network, such as the Internet, a wide area network (WAN), a local area network (LAN), a wireless communications network, and a wired communications network.

As used herein, the term "metadata" refers to any suitable data associated with presentable content. Examples of metadata include a title of presentable content, a name of a performer associated with presentable content, a name of a creator associated with presentable content, a channel identifier associated with presentable content, a time associated with presentable content, a format associated with presentable content, a frame identifier associated with presentable content, and a content type associated with presentable content.

Figure 1:
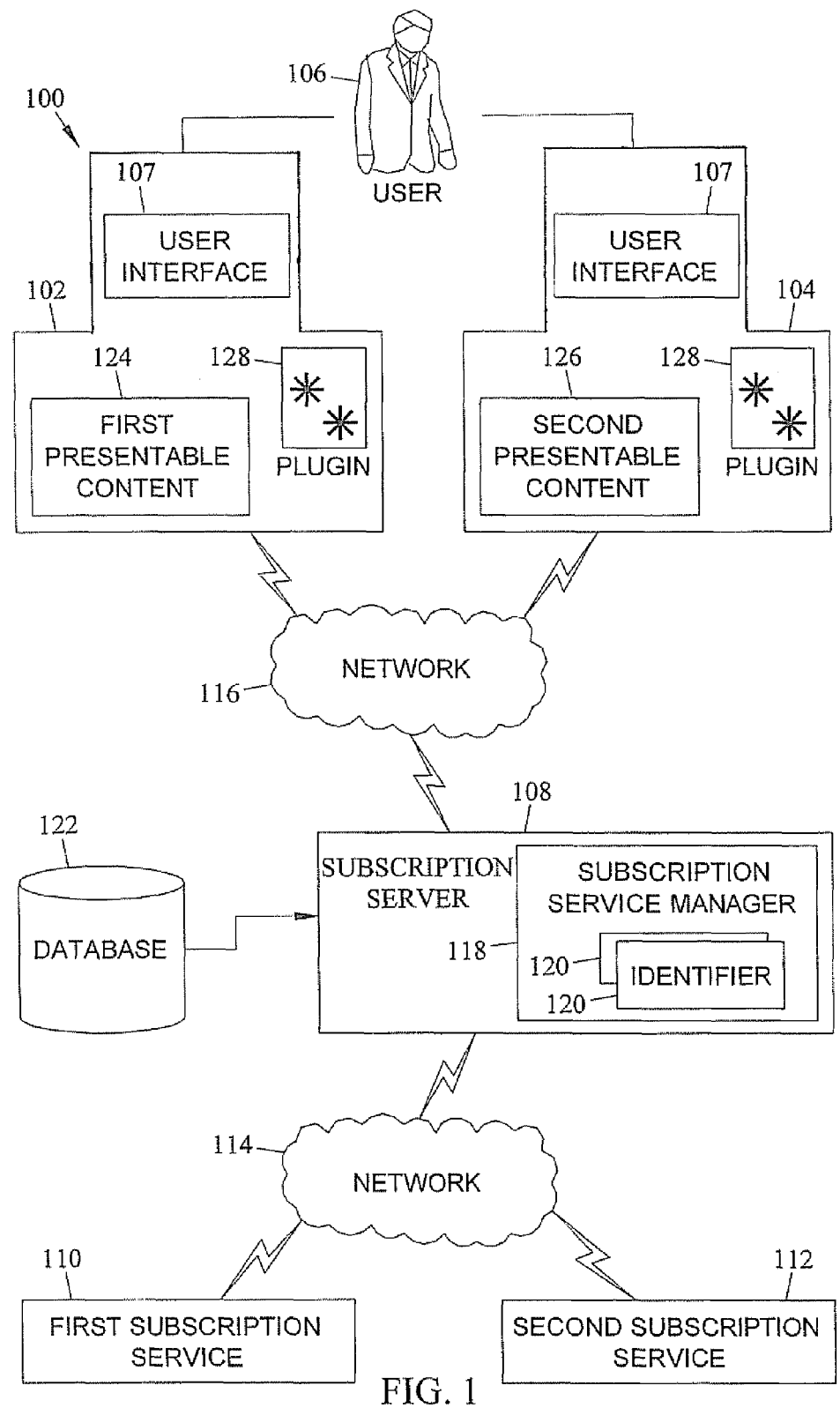
FIG. 1 a block diagram of an exemplary system for determining availability of presentable content via a subscription service according to an embodiment of the subject matter described herein.

FIG. 1 is a block diagram of an exemplary system 100 for determining availability of presentable content via a subscription service according to an embodiment of the subject matter described herein. Referring to FIG. 1, system 100 includes subscription server 108 configured to receive a selection of first presentable content associated with a first subscription service. For example, subscription server 108 can include communication circuitry for receiving the selection of first presentable content associated with the first subscription service from content devices 102 and 104. Content devices 102 and 104 can include user interfaces 107 configured to present presentable content to user 106. Each user interface 107 includes one or more components for interfacing with user 106. For example, user interface 107 may include a display and/or a speaker for presenting presentable content to user 106. In another example, user interface 107 may include a keyboard/keypad, a mouse, and/or a touchscreen for receiving input from user 106, such as the selection of first presentable content. Content devices 102 and 104 also include communication circuitry configured to send the selection via network 116 to subscription server 108, where the selection of the first presentable content associated with the first subscription service is received and further processed as described below. Devices 102 and 104 may each be any suitable electronic device, such as a mobile phone, a PDA, a network component, a television, a computer, or a device configured to implement a web portal.

Subscription server 108 is configured to receive presentable content from a subscription service for presentation to user 106 by one of presentable content devices 102 and 104. In particular, user 106 has a subscription to first and second subscription services 110 and 112 for receiving presentable content. For example, first subscription service 110 may be a cable television subscription service. In this example, user 106 may be subscribed to several television channels provided by first subscription service 110. In another example, second subscription service 112 may be an Internet-based music subscription service. In this example, user 106 can be subscribed to music made available by service 112. Another example of a subscription service may be a satellite-based subscription service, such as a satellite radio or satellite television subscription service. Although shown as separate services, subscription services 110 and 112 can be hosted by subscription server 108 without departing from the subject matter described here.

Presentable content made available by first and second subscription services 110 and 112 is communicated to subscription server 108 via a network 114 for distribution to one or more of devices 102 and 104 via network 116. Alternatively, presentable content is made available to devices 102 and 104 and/or subscription server 108 via separate networks. Examples of presentable content include video content, audio content, graphical content, and text content. Examples of presentable content formats can include MPEG2 format, MPEG3 format, advanced audio coding (AAC) format, windows media audio (WMA) format, waveform audio format (WAV), and motion-JPEG format.

Subscription server 108 includes a subscription service manager 118 configured to register and classify first and second subscription services 110 and 112. Subscription service manager 118 associates a subscription service with one of subscription service identifiers 120, which enable the coordination of communications between system components and the storage of data collected during subscription service management processes. A subscription service management database 122 stores information associated with subscription services for use in determining availability of presentable content at a subscription service. Although shown as a separate entity, it will be understood that database 122 can be included in subscription server 108. The data stored in database 122 and associated with a subscription service is accessed by use of a respective subscription service identifier 120. A subscription service is registered with subscription service manager 118. When a subscription service is registered with manager 118, database 122 stores metadata elements associated with the subscription service. It should be understood that although subscription service manager 118 is depicted as being included in subscription server 108 in FIG. 1, the functionality of subscription service manager 118 can be integrated within content devices 102 and/or 104, or can be integrated within a server hosting subscription services 110 and 112, without departing from the scope of the subject matter describe here.

As set forth above, presentable content is presented to user 106 via one of devices 102 and 104. User 106 may desire to obtain the same presentable content and/or related presentable content for use on the other of devices 102 and 104. For example, device 102 may present first presentable content 124 to user 106. First presentable content 124 is associated with first subscription service 110. User 106 may desire to have the same presentable content and/or related presentable content available on device 104. Further, user 106 may desire to determine the availability of the same presentable content and/or related presentable content from second subscription service 112. In order to determine the availability of the same or related presentable content at second subscription service 112, user 106 enters selection of first presentable content 124 via user interface 107 of device 102.

System 100 includes means for receiving a selection of first presentable content 124 associated with first subscription service 110. For example, subscription server 108 may receive the selection as described above in conjunction with FIG. 1. Further, system 100 includes means for receiving metadata associated with the selected first presentable content 124. For example, in response to receiving the selection, subscription service manager 118 is configured to receive metadata associated with the selected first presentable content 124.

System 100 includes means for determining, based on the received metadata, whether second presentable content corresponding to first presentable content 124 is available from second subscription service 112. For example, based on the retrieved metadata, subscription service manager 118 determines whether second presentable content corresponding to first presentable content 124 is available from second subscription service 112. Further, system 100 includes means for indicating whether the second presentable content is available for presentation via second subscription service 112. For example, subscription server 108 communicates with device 104 such that user interface 107 of device 107 indicates whether the second presentable content is available for presentation via second subscription service 112. User 106 selects to receive the second presentable content, and, in response to the selection, second presentable content 126 is communicated to device 104 for presentation to user 106.

Figure 2:
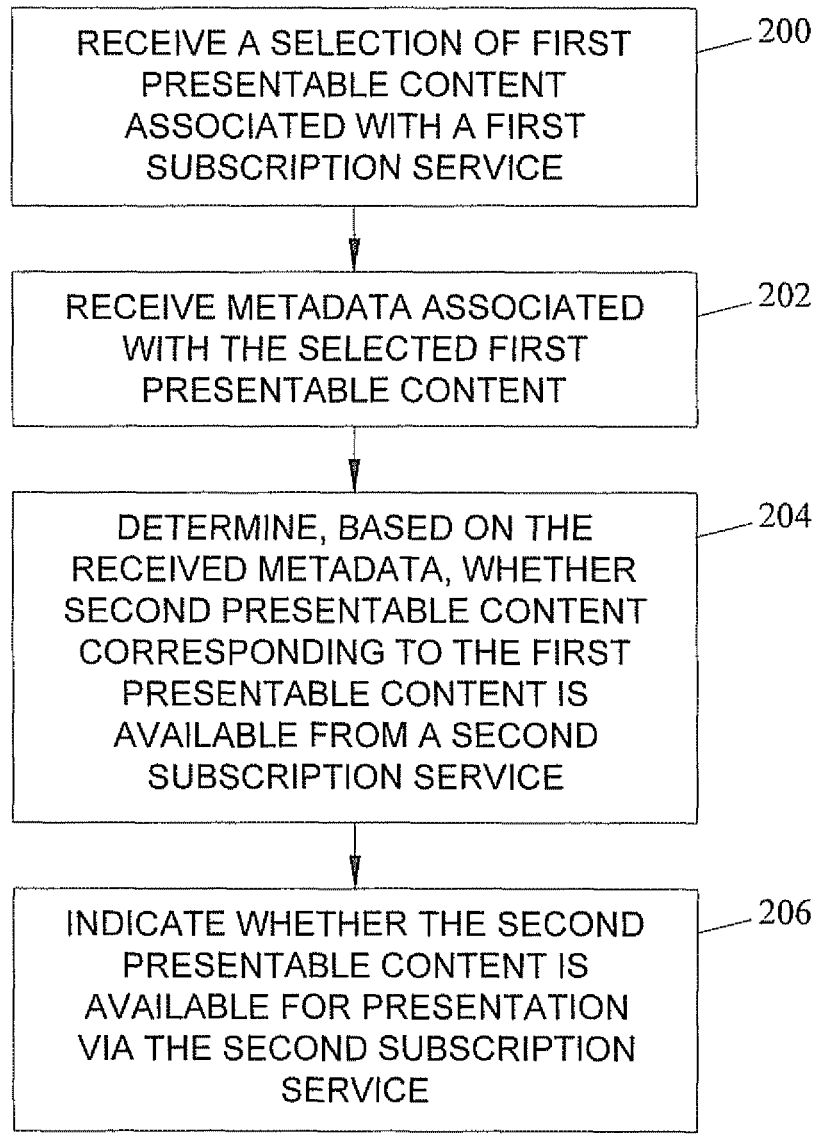
FIG. 2 is a flow chart of an exemplary process for determining availability of presentable content via a subscription service according to an embodiment of the subject matter described herein.

FIG. 2 is a flow chart illustrating an exemplary process for determining availability of presentable content via a subscription service according to an embodiment of the subject matter described herein. Referring to FIG. 2, in block 200 the process provides for receiving selection of first presentable content with a first subscription service. For example, as described above, subscription server 108 can include communication circuitry for receiving the selection of first presentable content 124 associated with the first subscription service 110 from content device 102. User 106 enters the selection of first presentable content 124 via user interface 107 of device 102. Content device 102 includes communication circuitry configured to send the selection via network 116 to subscription server 108, where the selection of the first presentable content associated with the first subscription service is received and further processed. First presentable content 124 is made available to device 102 from first subscription service 110, e.g., via subscription server 108. The selection of first presentable content 124 may be before, during, or after presentation of first presentable content 124 to user 106 via user interface 107. In one example, in response to the selection of first presentable content 124, device 102 may communicate metadata associated with first presentable content 124 to subscription service manager 118 via network 116. In another example, metadata associated with first presentable content 124 may be stored by manager 118 as first presentable content 124 is communicated from first subscription service 110, through subscription server 108, and to device 102.

In block 202, metadata associated with the selected first presentable content is received by manager 118. Examples of metadata received by subscription service manager 118 includes a title of first presentable content 124, a name of a performer associated with first presentable content 124, a name of a creator associated with first presentable content 124, a channel identifier associated with first presentable content 124, a time associated with first presentable content 124, a format associated with first presentable content 124, a frame identifier associated with first presentable content 124, and a content type associated with first presentable content 124. As set forth above, the metadata is received from device 102 and/or first subscription service 110.

Based on the received metadata, subscription service manager 118 determines whether second presentable content corresponding to first presentable content is available from second subscription service 112 (block 204). For example, subscription service manager 118 may search presentable content associated with second subscription service 112 for the second presentable content based on the metadata. In this example, the search of presentable content associated with second subscription service 112 may include searching metadata associated with the presentable content for a match to the received metadata. The second presentable content may include presentable content associated with the matching metadata.

In block 206, an indication whether the second presentable content is available for presentation via second subscription service 112 is provided. The indication may be one or more of providing a visual indication, an auditory indication, and a physical indication of the availability of the second presentable content. For example, if presentable content corresponding to first presentable content is determined to be available, the presentable content may be communicated to device 104, e.g., via subscription server 108 or second subscription service 112, is stored at device 104 as second presentable content 126, and the availability of second presentable content 126 presented to user 106. In another example, an indication of the availability of second presentable content 126 at second subscription service 112 may be provided to user 106 via user interface 107 of device 104. In one example, subscription service manager 118 may instruct user interface of device 104 to present the indication of availability of second presentable content 126 by controlling a display to display a text message indicating the availability of second presentable content 126. In another example, the indication of availability of second presentable content 126 may be presented by storing an indication of the availability of second presentable content 126 in a memory associated with device 104. In this example, user 106 may use user interface 107 of device 104 to access the memory and to display information regarding the contents of memory for receiving notification of the availability of second presentable content 126. In another example, the indication of availability of second presentable content 126 may be presented by changing an attribute of a display of user interface 107. In yet another example, the indication of availability of second presentable content 126 may be presented by activating an indicator light of a display of user interface 107. In another example, the indication of availability of second presentable content 126 may be presented by vibrating a housing of device 104 via an electromechanical device. User 106 may operate device 104 for presenting second presentable content 126 via user interface 107 of device 104.

Figure 3A:
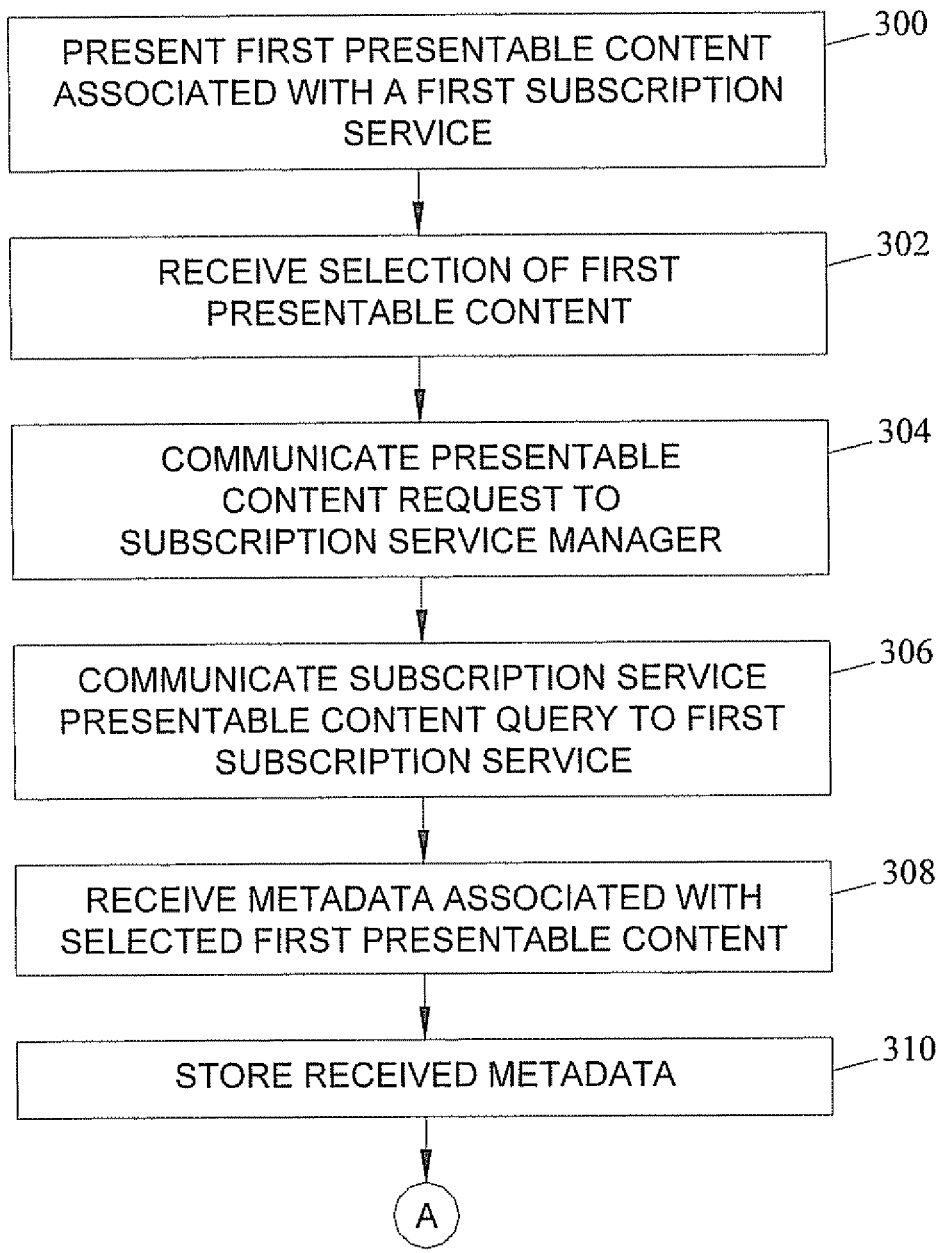
FIGS. 3A and 3B are a flow chart of an exemplary process for use by the system shown in FIG. 1 for determining availability of presentable content via a subscription service according to an embodiment of the subject matter described herein.
Figure 3B:
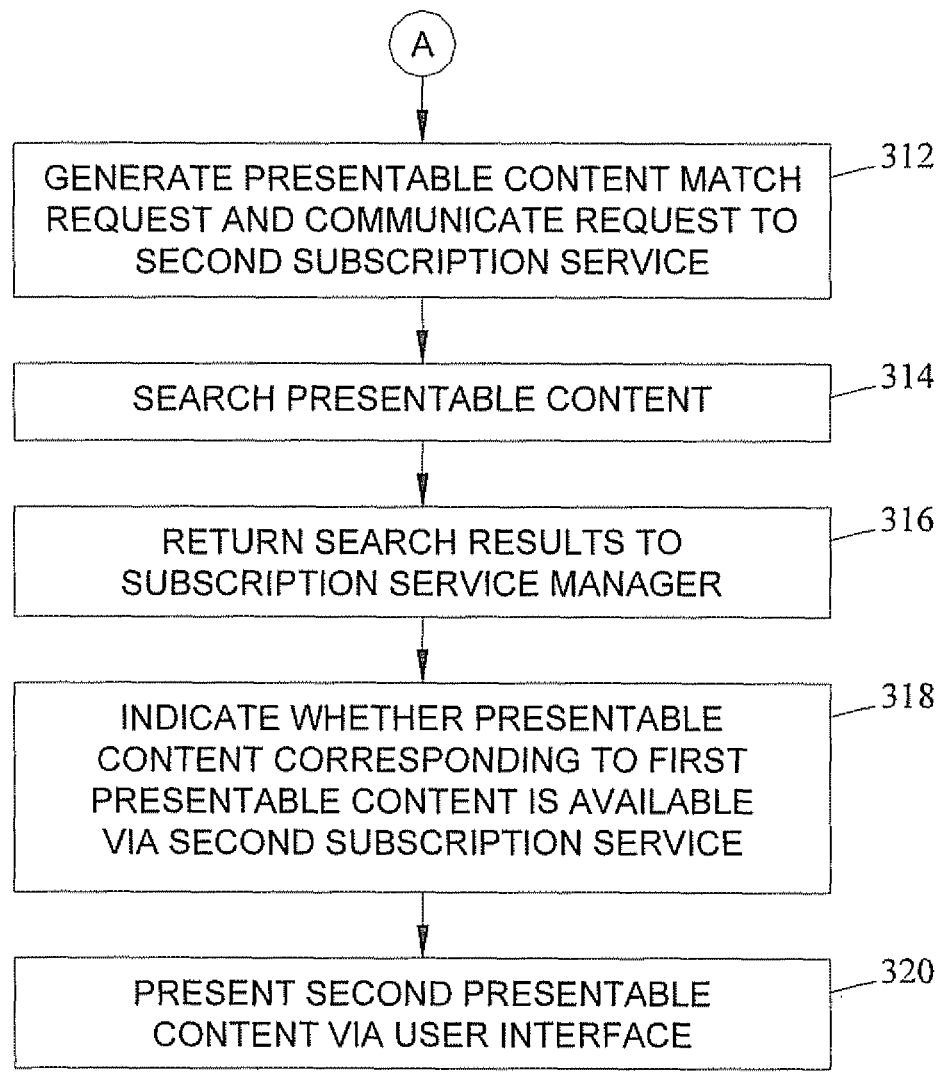

FIGS. 3A and 3B are a flow chart illustrating an exemplary process for use by system 100 shown in FIG. 1 for determining availability of presentable content at a subscription service according to an embodiment of the subject matter described herein. Referring to FIG. 3A, in block 300 the process provides for presenting first presentable content 124 to user 106 via device 102. In one example, first presentable content 124 may be streamed to device 102 from a server of first subscription service 110 for presentation to user 106. In another example, first presentable content 124 may be downloaded from first subscription service 110, stored for a period of time, and selected by user 106 for presentation via device 102. User 106 is subscribed to first and second subscription services 110 and 112. First and second subscription services 110 and 112 delivers presentable content to devices 102 and 104 by the same or different communications systems. Examples of delivering presentable content to device 102 from first and/or second subscription services 110 and 112 include providing presentable content via satellite-based communications, providing presentable content via the Internet, and providing presentable content via cable-television-based communications.

In block 302, device 102 receives a selection of first presentable content 124. User 106 selects first presentable content 124 for determining the availability of presentable content at second subscription service 112 that is the same and/or related to first presentable content 124. In one example of selecting first presentable content 124, user 106 may initialize a presentable content selection in relation to first subscription service 110. The presentable content selection is the identification of the particular presentable content that user 106 wants to make available via second subscription service 112. A presentable content selection is initialized by user 106 interacting with user interface 107 of device 102 or a client of first subscription service 110. In one example, the selection of first presentable content 124 may be made by pressing a button on a remote control. In another example, the selection may be made by interacting with device 102 by speech input. Selection of first presentable content 124 may occur before presentation of content 124, during presentation of content 124, or after presentation of content 124.

Device 102 includes a plugin application 128 configured to execute a presentable content selection. Device 104 includes a plugin application 128 for selection of presentable content. Plugin application 128 is associated with a respective one of devices 102 and 104 that the presentable content selection is initiated upon. In one example, plugin application 128 may be part of a subscription service client. In another example, plugin application 128 may be part of an operating system of a respective one of devices 102 and 104 used specifically for a subscription service. In another example, plugin application 128 may be a daemon configured to await and act upon presentable content selection commands. Plugin application 128 enables the conversion of a user's action of selecting presentable content into a presentable content request that is communicated to and parsed by subscription server 108.

In block 304, device 102 communicates a presentable content request to subscription service manager 118. For example, on initialization of a presentable content selection, plugin application 128 may collect information for communication to subscription server 108 as a presentable content request. In one example, the collected information may include a time of the presentable content selection and a subscription service identifier. In this example, the subscription service identifier may identify first subscription service 110.

The presentable content request functions to request from first subscription service 110 additional data about first presentable content 124 and functions to command second subscription service 112 to determine the availability of presentable content related to first presentable content 124. As stated above, the presentable content selection is communicated to subscription service manager 118. In this example, the request may be communicated to subscription service manager 118 residing in subscription server 108 remote to device 102. In another example, subscription service manager 118 may be resident on device 102. In another example, subscription service manager 118 may be resident on a component of network 116. In yet another example, subscription service manager 118 may be resident on a remote control (e.g., a television or music player remote control) for one of devices 102 and 104.

In block 306, subscription service manager 118 communicates a subscription service presentable content query to first subscription service 110 for requesting metadata associated with the selected first presentable content 124. For example, subscription service manager 118 may generate the subscription service presentable content query based on the time of the presentable content selection and the subscription service identifier indicated by the presentable content request. Each subscription service presentable content query is assigned an identifier and data collected via this query is stored in database 122 for use in coordinating the processes associated with retrieving metadata associated with the selected first presentable content 124.

The metadata requested by a subscription service presentable content query is based upon the selected presentable content. For example, different metadata elements may be requested based on a type of the selected presentable content. In one example, the query may be different for a music video and a television program. For example, a music video may include metadata fields such as artist, song title, and album title. In another example, a television program may include metadata fields such as actor, actress, and episode number.

Subscription service manager 118 executes the subscription service presentable content query against first subscription service 110 to receive metadata associated with the selected first presentable content 124 (block 308). Metadata is received via a stream of presentable content. For example, television broadcast signals or online music service streams may include metadata. In this example, manager 118 may control subscription server 108 to extract metadata from a stream corresponding to first presentable content 124. In one example, metadata may be extracted during selection of presentable content and/or during a subscription service presentable content query. For example, metadata associated with presentable content of a television subscription service may be available to subscription server 108. Table 1 below shows exemplary metadata associated with presentable content and made available to subscription server 108 from a television subscription service. The metadata illustrated in Table 1 may be displayable via a display in the format shown in Table 1 or in an alternate format that conveys the same information.

TABLE 1

Exemplary Metadata Associated with Presentable Content of a Television Subscription Service

| Channel | Time of Presentation of Presentable Content | |
|---|---|---|
| | 7:00 pm-8:00 pm | 8:00 pm-9:00 pm |
| BET 52 | <106 & Park: . . . TVPG, CC | |
| MTV 53 | Direct Effect TVPG | |
| WAUGDT 102 | Great Performances | |
| OVATION 125 | Suit: The Spirit . . . TVPG | Transatlantic Sessions TVPG |
| BLKFAM 129 | Great Performances | |
| BETJ 130 | Soul Sessions | |
| GAC | < Mainstreet Music Videos | GAC Nights    Grand Ole |

TABLE 1-continued

Exemplary Metadata Associated with Presentable Content of a Television Subscription Service

| Channel | Time of Presentation of Presentable Content | |
|---|---|---|
| | 7:00 pm-8:00 pm | 8:00 pm-9:00 pm |
| 131 | | Opry Live |
| MTV2 132 | Greatest Hits | |
| FUSE 133 | Steven's Untitled Rock Show TVPG | F List TVPG  F List TVPG |
| VH1CL 134 | Classic in Concert | 100 Greatest Artists of Hard Rock |

In Table 1, the metadata includes channel identifier, program title, rating, and time. User 106 operates user interface 107 of device 102 to select one of presentable content shown in Table 1. For example, user 106 may select the program titled "100 Greatest Artists of Hard Rock" on channel VH1CL. The program may be selected during presentation of the program. The selection of this program may include the program title, the time of the selection, and the subscription identifier associated with the television subscription service. The metadata shown in Table 1 may be available in a stream of first presentable content 124.

Table 2 below shows exemplary metadata associated with first presentable content 124 that is available by request from first subscription service 110.

TABLE 2

Exemplary Metadata Associated with First Presentable Content

| | 8:00 pm-9:00 pm | | | |
|---|---|---|---|---|
| Channel | 8:01-8:16 | 8:17-8:23 | 8:24-8:46 | 8:47-8:59 |
| VH1CL 134 | Song1 Content Type: Artists: Song: Album: Format: Release Date: | Song2 Content Type: Artists: Song: Album: Format: Release Date: | Song3 Content Type: Artists: Song: Album: Format: Release Date: | Song4 Content Type: Artists: Song: Album: Format: Release Date: |

The metadata in Table 2 represents exemplary metadata received by manager 118 on selection of the program titled "100 Greatest Artists of Hard Rock" on channel VH1CL. Four different songs are associated with the selection. The metadata is organized by time periods in which the different songs are presented. Each time period is associated with a song type, a content type, an artist name, a song name, an album name, a format type, and a release date corresponding to the song being presented. In one example, manager 118 may receive the metadata shown in Table 2 and extract only the metadata associated with a time of selection of first presentable content 124.

Subscription service manager 118 generates a subscription service presentable content query and communicate the query to first subscription service 110 to obtain the metadata. The query is generated based on a type of subscription service. For example, manager 118 may generate the query based on the query language that first subscription service 110 uses to deliver first presentable content 124.

In block 310, manager 118 stores the received metadata in database 122. For example, manager 118 may store the metadata shown in Tables 1 and 2 above in database 122. In one example, referring to the example of Table 2, if a selection was made at 8:20, manager 118 may extract the metadata associated with the time period of 8:17-8:23 for use in searching presentable content associated with second subscription service 112 for related presentable content. In particular, manager 118 uses the song title associated with the time period of 8:17-8:23 for searching presentable content available from second subscription service 112 for related presentable content. If matching or similar presentable content is found in the search, the presentable content is deemed as second presentable content 112.

In block 312, manager 118 generates a presentable content match request and communicate the request to second subscription service 112 for searching the presentable content of second subscription service 112 for matching or related presentable content. For example, if metadata values collected during a subscription service presentable content query identify an artist and song title, the artist and song title values may be included in the query for use in searching the presentable content of second subscription service 112 for matching or related presentable content. Second subscription service 112 searches its database of presentable content based on the query (block 314). For example, metadata values associated with presentable content of second subscription service 112 may be compared against the artist and song title values for finding a matching metadata value or similar metadata value.

Second subscription service 112 returns search results to subscription service manager 118. In one example, the search results may indicate that no presentable content was found that has matching or similar metadata. In another example, the search results may include the presentable content having the matching or similar metadata. In this example, the presentable content may be deemed second presentable content 126 and stored in database 122 or forwarded to device 104. In yet another example, the search results may identify the presentable content having matching or similar metadata that is available at second subscription service 112. It may be determined that second subscription service 112 has presentable content corresponding to first presentable content 124 when the search results include the presentable content having the matching or similar metadata or when the search results identify presentable content having matching or similar metadata.

Referring to FIG. 3B, manager 118 provides an indication whether presentable content corresponding to first presentable content 124 is available via second subscription service 112 (block 318). Manager 118 instructs device 104 to provide one or more of a visual indication, an auditory indication, and a physical indication of the availability of the presentable content via second subscription service 112. Manager 118 generates a message indicating the availability and communicate the message to device 104. Plugin application 128 of device 104 receives the message and, in response to the message, provide the indication whether the presentable content is available. In one example, second presentable content 126 may be communicated to device 104. In another example, when user 106 next interfaces with device 104, a message may be displayed that indicates the availability of the presentable content at second subscription service 112 and that provides instructions for accessing the presentable content. In another example of indicating the availability of the presentable content, subscription server 108 may communicate the results of the presentable content match request in a text message to the user's preferred client (e.g., instant message (IM) client, e-mail client, and short message service (SMS) client). In another example, information indicating the availability may be stored in a folder managed by plugin application 128 of device 104.

In block 320, device 104 operates to present second presentable content 126 to user 106 via user interface 107 of device 104. For example, in response to receiving an indication of the availability of second presentable content 126, user 106 may select displayed indicia (e.g., a displayed icon) corresponding to the second presentable content 126. In one example, in response to the selection, second presentable content 126 stored at device 104 may be presented via user interface 107 of device 104. In another example, in response to the selection, second presentable content 126 stored at database 122 may be accessed and communicated to device 104 for presentation via user interface 107. In yet another example, in response to the selection, second presentable content 126 may be retrieved from second subscription service 112 for presentation via user interface 107 of device 104.

In the examples described above, metadata of first presentable content 124 is used in a search for matching or similar second presentable content 126 via second subscription service 112. In an alternative embodiment, samples of first presentable content 124 may be used in a search for matching or similar second presentable content 126 at second subscription service 112. In one example, one or more samples of the selected first presentable content 124 may be obtained by device 102 and communicated to subscription service manager 118. Manager 118 generates a presentable content match request including the sample and communicate the request to second subscription service 112 for searching the presentable content of second subscription service 112 for presentable content having a matching or similar sample. In one example, a sample may be a frame of a video. In another example, a sample may include a frame number associated with a video. The sample is also combined with metadata values of first presentable content 124 for use in searching the presentable content of second subscription service 112 for presentable content having a matching or similar sample. Further, user 106 is asked to provide more detailed information for use in the search. The information provided by user 106 is combined with the sample and/or metadata for use in the search of first subscription service 112.

A user selects a sample of presentable content but be interested receiving content related to a larger portion of the presentable content than the selected sample. For example, a user may select a frame of a video being presented on a television. In this example, the user may be interested in a scene of a television program associated with the selected frame. In another example, the user may be interested in the entirety of the television program associated with the selected frame. A subscription service manager is configured to identify all segments of the presentable content that include the selection and present the segments to the user for selection. For example, identification of a scene or the entirety of the television program may be presented to the user for selection. The user may select the identified scene or the entirety of the television program for use in determining whether related presentable content is available via a subscription service. The selection is used by a subscription service manager for forming the subscription service presentable content query.

In the examples described above, a subscription service manager selects a subscription service to search for corresponding presentable content based on a compatibility of the subscription service with metadata elements of the selected presentable content. The subscription service is selected from among a plurality of subscription services by determining the compatibility of the subscription services with a plurality of elements of the metadata. For example, the metadata elements may indicate a format type, and the subscription service is selected based on its compatibility with the format type.

In one example, the metadata elements may be organized in a predetermined hierarchical order. In this example, a subscription service may be selected based on whether it is compatible with the metadata elements in accordance with the predetermined hierarchical order. For example, a content type of the presentable content may be the highest ranked metadata element in the predetermined hierarchical order. There are more than one subscription service that is compatible with the content type of the presentable content. In this case, a next ranked metadata element is compared to the subscription services that are compatible with the content type. In some cases, for example, the content type of second subscription service 112 may not match the content type of first presentable content 124. Subscription service manager 118 stores information regarding the relationships between subscription services that are related. For example, a Rhapsody client device may play music and videos. In contrast, for example, a radio may only play music. The Rhapsody client device and the radio are related to the key metadata elements of a music video even though the match is not exact. Manager 118 stores information indicating that the Rhapsody client device and the radio are related in that both play music. Such a relationship may not be made between a washer or dryer and a Rhapsody client device, because the washer or dryer does not play music. After a compatible subscription service has been identified, the identified subscription service is searched for determining whether related presentable content is available at the subscription service. For example, second subscription service 112 may be queried based on content type associated with service 112 and metadata values of first presentable content 124.

In some of the examples described above, metadata is received from a subscription service in response to executing a subscription service presentable content query against the subscription service. The received metadata is stored in a database associated with a subscription service manager. In one example, the received metadata may be stored at the database and used in subsequent requests for metadata associated with selected presentable content. If the search of the database does not result in metadata associated with selected presentable content, the subscription service presentable content query is sent to the subscription service. This process may be advantageous, for example, because it can reduce communications to the subscription service.

The subject matter described herein may be implemented using a computer readable medium containing a computer program, executable by a machine, such as a computer. Exemplary computer readable media suitable for implementing the subject matter described herein include chip memory devices, disk memory devices, programmable logic devices, application specific integrated circuits, and downloadable electrical signals. In addition, a computer-readable medium that implements the subject matter described herein may be located on a single device or computing platform or may be distributed across multiple devices or computing platforms.

As used here, a "computer readable medium" can be any means that can contain, store, communicate, propagate, or transport the computer program for use by or in connection with the instruction execution machine, system, apparatus, or device. The computer readable medium can be, for example, but not limited to, an electronic, magnetic, optical, electromagnetic, infrared, or semiconductor machine, system, apparatus, device, or propagation medium.

More specific examples (a non-exhaustive list) of the computer readable medium can include the following: a wired network connection and associated transmission medium, such as an ETHERNET transmission system, a wireless network connection and associated transmission medium, such as an IEEE 802.11(a), (b), or (g) or a BLUETOOTH transmission system, a wide-area network (WAN), a local-area network (LAN), the Internet, an intranet, a portable computer diskette, a random access memory (RAM), a read only memory (ROM), an erasable programmable read only memory (EPROM or Flash memory), an optical fiber, a portable compact disc (CD), a portable digital video disc (DVD), and the like.

The executable instructions of a computer program for carrying out the methods illustrated in FIGS. 2, 3A, and 3B can be embodied in any machine or computer readable medium for use by or in connection with an instruction execution machine, system, apparatus, or device, such as a computer-based or processor-containing machine, system, apparatus, or device, that can read or fetch the instructions from the machine or computer readable medium and execute the instructions.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for identifying presentable content via a subscription service, the method comprising:
   receiving a request for second presentable content corresponding to first presentable content, wherein the request includes an identification of first presentable content associated with a first subscription service, the first presentable content having a first type;
   receiving metadata associated with the first presentable content wherein the metadata includes at least one of a title of the first presentable content, a name of a performer associated with the first presentable content, a name of a creator associated with the first presentable content, a channel identifier associated with the first presentable content, a time associated with the first presentable content, a format of the first presentable content, a frame identifier associated with the first presentable content, and a content type associated with the first presentable content;
   identifying, based on the received metadata, second presentable content corresponding to the first presentable content, the second presentable content available from a second subscription service and having a second type different from the first type, wherein identifying second presentable content corresponding to the first presentable content includes searching, based on the received metadata, presentable content associated with the second subscription service for the second presentable content; and
   providing an indication that identifies the second presentable content from the second subscription service.

2. The method of claim 1 wherein receiving an identification of first presentable content includes receiving a selection of at least one of video content, graphical content, audio content, and text content.

3. The method of claim 1 wherein receiving an identification of first presentable content includes receiving a selection of the first presentable content during presentation of the first presentable content.

4. The method of claim 1 wherein receiving an identification of first presentable content includes receiving a selection of the first presentable content in at least one of MPEG 2 format, MPEG 3 format, advanced audio coding (AAC) format, windows media audio (WMA) format, waveform audio format (WAV), and motion-JPEG format.

5. The method of claim 1 wherein receiving an identification of first presentable content associated with a first subscription service includes receiving a selection of the first presentable content associated with at least one of a music subscription service, an Internet-based subscription service, a television subscription service, and a satellite-based subscription service.

6. The method of claim 1 wherein searching presentable content associated with the second subscription service includes searching metadata associated with the presentable content for a match to the received metadata.

7. The method of claim 1 wherein providing an indication that the second presentable content is available includes instructing at least one electronic device to provide at least one of a visual indication, an auditory indication, and a physical indication of the availability of the second presentable content.

8. The method of claim 7 wherein instructing at least one electronic device to provide a visual indication includes instructing the at least one electronic device to at least one of display a text message for presenting the second presentable content, change an attribute of the display, and activate an indicator light.

9. The method of claim 7 wherein instructing at least one electronic device to provide a physical indication includes instructing the at least one electronic device to vibrate a housing for the at least one electronic device.

10. The method of claim 1 comprising receiving a sample of the first presentable content, and wherein identifying second presentable content corresponding to the first presentable content is based on the received sample of the first presentable content.

11. The method of claim 1 wherein the metadata includes a plurality of metadata elements and wherein the method comprises selecting the second subscription service from a plurality of subscription services based on compatibility of one of the subscription services with the metadata elements.

12. The method of claim 11 wherein the metadata elements are organized in a predetermined hierarchical order and wherein selecting the second subscription service from a plurality of subscription services includes determining whether one of the subscription services is compatible with the metadata elements in accordance with the predetermined hierarchical order.

13. The method of claim 12 wherein selecting the second subscription service from a plurality of subscription services based on compatibility of one of the subscription services with the metadata elements includes selecting the second subscription service from the subscription services based on a content type associated with the first presentable content.

14. A system for identifying presentable content via a subscription service, the system comprising:
   a subscription server including a processor for executing components, the components including:
      a subscription service component configured to receive a request for second presentable content corresponding to first presentable content, wherein the request includes an identification of first presentable content associated with a first subscription service, the first presentable content having a first type; and a subscription service manager component configured to receive metadata associated with the first presentable content, wherein the metadata includes at least one of a title of the first presentable content, a name of a performer associated with the first presentable content, a name of a creator associated with the first presentable content, a channel identifier associated with the first presentable content, a time associated with the first presentable content, a format of the first presentable content, a frame identifier associated with the first presentable content, and a content type associated with the first presentable content, the subscription service manager component configured to identify, based on the received metadata, second presentable content corresponding to the first presentable content, the second presentable content available from a second subscription service and having a second type different from the first type, wherein the subscription service manager component is configured to identify by searching, based on the received metadata, presentable content associated with the second subscription service for the second presentable content, and the subscription service manager component configured to provide an indication that identifies the second presentable content from the second subscription service.

15. The system of claim 14 wherein the subscription service component is configured to receive a selection of at least one of video content, graphical content, audio content, and text content.

16. The system of claim 14 wherein the subscription service component is configured to receive a selection of the first presentable content during presentation of the first presentable content.

17. The system of claim 14 wherein the subscription service component is configured to receive a selection of the first presentable content in at least one of MPEG 2 format, MPEG 3 format, advanced audio coding (AAC) format, windows media audio (WMA) format, waveform audio format (WAV), and motion-JPEG format.

18. The system of claim 14 wherein the subscription service component is configured to receive a selection of the first presentable content associated with at least one of a music subscription service, an Internet-based subscription service, a television subscription service, and a satellite-based subscription service.

19. The system of claim 14 wherein the subscription service manager component is configured to search metadata associated with the presentable content for a match to the received metadata.

20. The system of claim 14 wherein the subscription service manager component is configured to instruct at least one electronic device to provide at least one of a visual indication, an auditory indication, and a physical indication of the availability of the second presentable content.

21. The system of claim 20 wherein the subscription service manager component is configured to instruct a display to at least one of display a text message for presenting the second presentable content, change an attribute of the display, and activate an indicator light.

22. The system of claim 20 wherein the subscription service manager component is configured to instruct the at least one electronic device to vibrate a housing for indicating the availability of the second presentable content.

23. The system of claim 14 wherein the subscription service manager component is configured to receive a sample of the first presentable content and configured to identify the second presentable content from the second subscription service based on the received sample of the first presentable content.

24. The system of claim 14 wherein the metadata includes a plurality of metadata elements and wherein the subscription service manager is configured to select the second subscription service from a plurality of subscription services based on compatibility of one of the subscription services with the metadata elements.

25. The system of claim 24 wherein the metadata elements are organized in a predetermined hierarchical order and wherein the subscription service manager is configured to determine whether one of the subscription services is compatible with the metadata elements in accordance with the predetermined hierarchical order.

26. The system of claim 25 wherein the subscription service manager component is configured to select the second subscription service from the subscription services based on a content type associated with the first presentable content.

27. A tangible computer readable medium containing a computer program, executable by a machine, for identifying presentable content via a subscription service, the computer program comprising executable instructions for:

receiving a request for second presentable content corresponding to first presentable content, wherein the request includes an identification of first presentable content associated with a first subscription service, the first presentable content having a first type;

receiving metadata associated with the first presentable content wherein the metadata includes at least one of a title of the first presentable content, a name of a performer associated with the first presentable content, a name of a creator associated with the first presentable content, a channel identifier associated with the first presentable content, a time associated with the first presentable content, a format of the first presentable content, a frame identifier associated with the first presentable content, and a content type associated with the first presentable content;

identifying, based on the received metadata, second presentable content corresponding to the first presentable content, the second presentable content available from a second subscription service and having a second type different from the first type, wherein identifying second presentable content corresponding to the first presentable content includes searching, based on the received metadata, presentable content associated with the second subscription service for the second presentable content; and providing an indication that identifies the second presentable content from the second subscription service.

28. A method for identifying presentable content, the method comprising:

receiving an identification of first presentable content having a first type;

identifying metadata associated with the first presentable content, wherein the metadata includes at least one of a title of the first presentable content, a name of a performer associated with the first presentable content, a name of a creator associated with the first presentable content, a channel identifier associated with the first presentable content, a time associated with the first presentable content, a format of the first presentable content, a frame identifier associated with the first presentable content, and a content type associated with the first presentable content;

identifying, based on the identified metadata, second presentable content corresponding to the first presentable content, the second presentable content having a second type different from the first type, wherein identifying second presentable content corresponding to the first presentable content includes searching, based on the received metadata, presentable content associated with the second subscription service for the second presentable content; and providing an indication that identifies the second presentable content is available.

29. The method of claim 28 comprising receiving a sample of the first presentable content, and wherein identifying second presentable content corresponding to the first presentable content is based on the received sample of the first presentable content.

30. The method of claim 29 wherein identifying second presentable content corresponding to the first presentable content includes determining whether the second presentable content contains at least a portion of the received sample of the first presentable content.

31. The method of claim 28 wherein at least one of the first presentable content and the second presentable content is available from a subscription service.

32. The method of claim 28 wherein identifying metadata includes receiving metadata.

33. A tangible computer readable medium containing a computer program, executable by a machine, for identifying presentable content, the computer program comprising executable instructions for:

receiving a request for second presentable content corresponding to first presentable content, wherein the request includes an identification of first presentable content associated with a first subscription service, the first presentable content having a first type;

receiving metadata associated with the first presentable content, wherein the metadata includes at least one of a title of the first presentable content, a name of a performer associated with the first presentable content, a name of a creator associated with the first presentable content, a channel identifier associated with the first presentable content, a time associated with the first presentable content, a format of the first presentable content, a frame identifier associated with the first presentable content, and a content type associated with the first presentable content;

identifying, based on the received metadata, second presentable content corresponding to the first presentable content, the second presentable content available from a second subscription service and having a second type different from the first type, wherein identifying second presentable content corresponding to the first presentable content includes searching, based on the received metadata, presentable content associated with the second subscription service for the second presentable content; and providing an indication that identifies the second presentable content from the second subscription service.

34. A system for identifying presentable content, the system comprising:

a subscription server including a processor for executing system components, the components including:
a manager component configured to receive an identification of first presentable content having a first type, the manager component configured to identify metadata associated with the first presentable content, wherein the metadata includes at least one of a title of the first presentable content, a name of a performer associated with the first presentable content, a name of a creator associated with the first presentable content, a channel identifier associated with the first presentable content, a time associated with the first presentable content, a format of the first presentable content, a frame identifier associated with the first presentable content, and a content type associated with the first presentable content, the manager component configured to identify, based on the identified metadata, second presentable content corresponding to the first presentable content, the second presentable content having a second type different from the first type, wherein the manager component is configured to identify by searching, based on the received metadata, presentable content associated with the second subscription service for the second presentable content and the manager component configured to provide an indication to a device that identifies the second presentable content.

35. The system of claim 34 wherein the manager component receives the identification of the first presentable content from the device.

36. The system of claim 34 wherein the manager component receives the identification of the first presentable content from a second device.

37. The system of claim 34 wherein the manager component is configured to receive a sample of the first presentable content, and wherein the manager component is configured to identify the second presentable content based on the received sample of the first presentable content.

38. The system of claim 34 wherein the manager component is configured to determine whether the second presentable content contains at least a portion of the received sample of the first presentable content.

39. The system of claim 34 wherein at least one of the first presentable content and the second presentable content is available from a subscription service.

40. The system of claim 34 wherein the manager component is configured to receive the metadata associated with the first presentable content.

41. A method for identifying presentable content, the method comprising:

receiving an identification of first presentable content during presentation of the first presentable content via a first subscription service;

generating a request for second presentable content corresponding to the first presentable content, the request including information identifying the first presentable content, the information including at least one of a title of the first presentable content, a name of a performer associated with the first presentable content, a name of a creator associated with the first presentable content, a channel identifier associated with the first presentable content, a time associated with the first presentable content, a format of the first presentable content, a frame identifier associated with the first presentable content, and a content type associated with the first presentable content;

transmitting the request;

receiving, in response to the request, results from a search including an identification of second presentable content available from a second subscription service, wherein the search is based on the information associated with the first presentable content included in the request; and presenting an indication that identifies the second presentable content available from the second subscription service.

42. The method of claim 41 wherein receiving an identification of first presentable content includes receiving a selection of at least one of video content, graphical content, audio content, and text content.

43. The method of claim 41 wherein the first subscription service includes at least one of a music subscription service, an Internet-based subscription service, a television subscription service, and a satellite-based subscription service.

44. The method of claim 41 wherein presenting the indication that the second presentable content is available includes instructing at least one electronic device to provide at least one of a visual indication, an auditory indication, and a physical indication of the availability of the second presentable content.

45. The method of claim 44 wherein instructing the at least one electronic device to provide a visual indication includes instructing the at least one electronic device to at least one of display a text message for presenting the second presentable content, change an attribute of the display, and activate an indicator light.

46. The method of claim 44 wherein instructing the at least one electronic device to provide a physical indication includes instructing the at least one electronic device to vibrate a housing for the at least one electronic device.

47. The method of claim 41 comprising receiving a sample of the first presentable content, and wherein the request for second presentable content corresponding to the first presentable content includes the sample of the first presentable content.

48. An electronic device for identifying presentable content, the electronic device comprising:
a processor for executing components, the components including:
a user interface component configured to receive an identification of first presentable content during presentation of the first presentable content via a first subscription service; and
a communication component configured to generate a request for second presentable content corresponding to the first presentable content, the request including information identifying the first presentable content, the information including at least one of a title of the first presentable content, a name of a performer associated with the first presentable content, a name of a creator associated with the first presentable content, a channel identifier associated with the first presentable content, a time associated with the first presentable content, a format of the first presentable content, a frame identifier associated with the first presentable content, and a content type associated with the first presentable content,
the communication component configured to transmit the request, and receive, in response to the request, results from a search including an identification of second presentable content available from a second subscription service, wherein the search is based on the information associated with the first presentable content included in the request;
the user interface component further configured to present an indication that identifies the second presentable content available from the second subscription service.

49. The electronic device of claim 48 wherein the user interface component is configured to receive a selection of at least one of video content, graphical content, audio content, and text content.

50. The electronic device of claim 48 wherein the user interface is configured to provide at least one of a visual indication, an auditory indication, and a physical indication of the availability of the second presentable content.

51. The electronic device of claim 48 wherein the user interface is configured to at least one of provide display a text message for presenting the second presentable content, change an attribute of the display, and activate an indicator light.

52. The electronic device of claim 48 wherein the user interface is configured to vibrate a housing of the at least one electronic device.

53. The electronic device of claim 48 wherein the user interface component is configured to receive a sample of the first presentable content, and wherein the communication component is configured to includes the sample of the first presentable content in the request.

54. A tangible computer readable medium containing a computer program, executable by a machine, for identifying presentable content, the computer program comprising executable instructions for:
receiving an identification of first presentable content during presentation of the first presentable content via a first subscription service;
generating a request for second presentable content corresponding to the first presentable content, the request including information identifying the first presentable content, the information including at least one of a title of the first presentable content, a name of a performer associated with the first presentable content, a name of a creator associated with the first presentable content, a channel identifier associated with the first presentable content, a time associated with the first presentable content, a format of the first presentable content, a frame identifier associated with the first presentable content, and a content type associated with the first presentable content;
transmitting the request;
receiving, in response to the request, results from a search including an identification of second presentable content available from a second subscription service, wherein the search is based on the information associated with the first presentable content included in the request; and
presenting an indication that identifies the second presentable content available from the second subscription service.

* * * * *